US012622429B2

(12) United States Patent
Johansen et al.

(10) Patent No.: US 12,622,429 B2
(45) Date of Patent: May 12, 2026

(54) UV PEST REPELLING, KILLING, AND/OR DAMAGING DEVICE AND METHOD FOR THE SAME

(71) Applicant: UVL A/S, Åbyhøj (DK)

(72) Inventors: Peter Johansen, Åbyhøj (DK); Jens Christian Langhoff, Åbyhøj (DK); Christian Kanstrup Holm, Åbyhøj (DK); Nicolas Volet, Åbyhøj (DK)

(73) Assignee: UVL A/S, Åbyhøj (DK)

( * ) Notice: Subject to any disclaimer, the term of this patent is extended or adjusted under 35 U.S.C. 154(b) by 0 days.

(21) Appl. No.: 18/845,840

(22) PCT Filed: Feb. 10, 2023

(86) PCT No.: PCT/EP2023/053337
§ 371 (c)(1),
(2) Date: Sep. 10, 2024

(87) PCT Pub. No.: WO2023/152309
PCT Pub. Date: Aug. 17, 2023

(65) Prior Publication Data
US 2025/0241291 A1 Jul. 31, 2025

(30) Foreign Application Priority Data

Feb. 11, 2022 (DK) .............................. PA202270056

(51) Int. Cl.
*A01M 29/10* (2011.01)
*A01M 1/22* (2006.01)
(52) U.S. Cl.
CPC ............ *A01M 29/10* (2013.01); *A01M 1/226* (2013.01)

(58) Field of Classification Search
CPC ........ A01M 29/10; A01M 1/22; A01M 1/226; A01P 17/00
See application file for complete search history.

(56) References Cited

U.S. PATENT DOCUMENTS 5,607,711 A * 3/1997 Lagunas-Solar .......... A23L 3/00
426/248
9,706,764 B2 7/2017 Koo et al.
(Continued)

FOREIGN PATENT DOCUMENTS

CN 1028233393 A 12/2012
CN 104094915 A 10/2014
(Continued)

OTHER PUBLICATIONS

International Search Report and Written Opinion of the ISA/EP in PCT/EP2023/053337, May 2, 2023, 10 pages.
(Continued)

*Primary Examiner* — Joshua J Michener
*Assistant Examiner* — Henry Hooper Mudd
(74) *Attorney, Agent, or Firm* — ICE MILLER LLP; Justin D. Swindells

(57) ABSTRACT

The present invention relates to a pest repelling, killing, and/or damaging UV light-emitting device (100) comprising—a housing (200),—a control element (110) configured to output a control signal (111), and—a UV light-emitting element (115) configured to emit, in response to the control signal (111), far-UVC light (125) thereby repelling, killing, and/or damaging one or more pests, e.g. or in particular mosquitos, irradiated by the emitted far-UVC light (125).

21 Claims, 7 Drawing Sheets

(56)            References Cited

U.S. PATENT DOCUMENTS

| | | | |
|---|---|---|---|
| 2004/0181997 A1 | 9/2004 | Lee et al. | |
| 2009/0277074 A1 | 11/2009 | Noronha | |
| 2013/0100977 A1 | 4/2013 | Smeeton et al. | |
| 2014/0261151 A1* | 9/2014 | Ronning | A01M 29/10 |
| 2017/0006848 A1* | 1/2017 | Barroso | A01M 1/04 |
| 2019/0008132 A1 | 1/2019 | Eom | |
| 2019/0113219 A1 | 4/2019 | Niemiec et al. | |
| 2019/0133106 A1 | 5/2019 | Eom et al. | |
| 2019/0313619 A1 | 10/2019 | Lee et al. | |
| 2020/0053854 A1* | 2/2020 | Xu | H05B 33/08 |

FOREIGN PATENT DOCUMENTS

| | | |
|---|---|---|
| CN | 214047283 U | 8/2021 |
| DE | 102017211417 A1 | 1/2019 |
| EP | 1 042 006 B1 | 8/2001 |
| EP | 4 154 709 A1 | 3/2023 |
| GB | 2486456 A | 6/2012 |
| WO | 2017/159937 A1 | 9/2017 |
| WO | 2020/125688 A1 | 6/2020 |
| WO | 2022005505 A1 | 1/2022 |

OTHER PUBLICATIONS

Hori, M., et al., "Lethal effects of short-wavelength visible light on insects", Scientific Reports, Dec. 9, 2014, 4(7383):1-6.

First Technical Examination issued in PA2022-70056, dated Aug. 11, 202 [6 Pages].

Office Action issued in corresponding China Application No. 202380033291.1 mailed Feb. 27, 2026.

* cited by examiner

1

UV PEST REPELLING, KILLING, AND/OR DAMAGING DEVICE AND METHOD FOR THE SAME

CROSS-REFERENCE TO RELATED APPLICATIONS

This application is a National Stage of International Application No. PCT/EP2023/053337 filed Feb. 10, 2023, which claims priority to Denmark Patent Application No. PA202270056 filed Feb. 11, 2022, the disclosures of which are incorporated herein by reference in their entirety.

FIELD OF THE INVENTION

The present invention relates generally to a pest repelling, killing, and/or damaging UV light emitting device and a pest repelling, killing, and/or damaging UV light irradiation method.

BACKGROUND

Various pests impose various challenges and problems in different parts of the world such as destroying or damaging crops, transferring diseases to humans, and so on.

For example, mosquitos are well-known transporters and transmitters of a variety of diseases and are one of the most significant hygiene pests in particular in tropical and sub-tropical parts of the world. Further, mosquitos are well-known transporters and transmitters of a variety of diseases and are thereby one of the most significant disease-spreading pests. Mosquitos are for example a key factor in the spreading of malaria, where in particular Anopheles mosquitos are known for this. Malaria typically spreads when a mosquito becomes infected after biting an infected person and the infected mosquito then subsequently bites a non-infected person.

Typically mosquitos are controlled by chemical insecticides e.g. by using insecticides to kill mosquitos in water reservoirs or similar and/or according to other insecticide-based strategies.

However, using insecticides or other insecticide-based strategies likely damages other non-harmful insects that are ecological significant e.g. as part of a food chain or similar and may also damage plants, trees, etc. Additionally, exposing water reservoirs or similar to insecticides may very well have ecological drawbacks. Furthermore, insecticide resistance has been observed in several mosquito species recently.

Existing non-insecticide-based solutions include mosquito repelling devices or mosquito attracting devices comprises UV emitting light sources for various purposes at various (peak) wavelength intervals. The designation "UV-A" is typically used for UV light having a wavelength of 315 nm (nanometres) to 400 nm (nanometres), the designation "UVB" or "UV-B" is typically used for UV light having a wavelength of 280 nm to 315 nm, and the designation "UVC" or "UV-C" is typically used for UV light having a wavelength of 100 nm to 280 nm.

For example, patent U.S. Pat. No. 9,706,764 discloses an insect trap using an ultraviolet light-emitting diode (UV LED) emitting UV light having a peak wavelength of 335 nm to 395 nm. Patent application US 2004/0181997 relates to a mosquito repelling apparatus with an air filtering function comprising an ultraviolet ray lamp having a wavelength ranged from 300 nm to 400 nm. Patent application US 2009/0277074 discloses a multipurpose apparatus capable of attracting, trapping, damaging instantly and subsequent killing of insects including mosquitos.

However, detrimental effects for humans due to exposure of UV light having at least some of the disclosed wavelengths are well-known and e.g. include skin aging, increasing risk of cancer, skin irritation (erythema), eye irritation (conjunctivitis), etc.

The article "Lethal effects of short-wavelength visible light on insects"; by Masatoshi Hori, Kazuki Shibuya, Mitsunari Sato, and Yoshino Saito, amongst others published in Scientific Reports, discloses that while lethal effects of ultraviolet (UV) light, particularly shortwave (i.e., UVB and UVC) light, on organisms are well known, the effects of irradiation with visible light remain unclear, although shorter wavelengths are known to be more lethal. Irradiation with visible light was not thought to cause mortality in complex animals including insects. Here, however, it was found that irradiation with short-wavelength visible (blue) light killed eggs, larvae, pupae and adults of Drosophila melanogaster. Blue light was also lethal to mosquitos and flour beetles, but the effective wavelength at which mortality occurred differed among the insect species. The article suggests that highly toxic wavelengths of visible light are species-specific in insects and that shorter wavelengths are not always more lethal. According to the article, for some animals, such as insects, blue light is more harmful than UV light. The article investigates the lethal effect of light (wavelengths from 378 to 732 nm) on D. melanogaster pupae using LEDs.

Accordingly, it would be an advantage to provide an efficient pest (and in particular mosquito) killing and/or damaging device and method. An additional advantage would be to provide a pest (and in particular mosquito) killing and/or damaging device and method that is safe for humans. A further advantage would be to provide a pesticide-free pest (and in particular mosquito) killing and/or damaging device and method. Yet a further advantage would be to provide an eco-friendly or chemical-free pest (and in particular mosquito) killing and/or damaging device and method.

Further, it would accordingly be an advantage to provide an efficient pest (and in particular mosquito) repelling device and method. A further additional advantage would be to provide a pest (and in particular mosquito) repelling device, and method that is safe for humans. A further advantage would be to provide a pesticide-free pest (and in particular mosquito) repelling device and method. Yet a further advantage would be to provide an eco-friendly or chemical-free pest (and in particular mosquito) repelling device and method.

SUMMARY

It is an object to provide a pest repelling, killing, and/or damaging UV light emitting device alleviating one or more of the above-mentioned drawbacks at least to an extent.

According to a first aspect, this is achieved, at least to an extent, by a pest repelling, killing, and/or damaging UV light-emitting device comprising
   a housing,
   a control element configured to output a control signal, and
   a UV light-emitting element configured to emit, in response to the control signal, far-UVC light thereby repelling, killing, and/or damaging one or more pests, e.g. or in particular mosquitos, irradiated by the emitted far-UVC light.

In this way, a UV light-emitting device is provided efficiently repelling, killing, and/or damaging one or more pests (such as mosquitos and other insects/winged insects, arachnids, and other applicable pests) irradiated by the emitted far-UVC light. Furthermore, the UV light-emitting device enables this in a pesticide-free and eco-friendly way. The term "far-UVC" as used herein is meant as UV light having or comprising a wavelength or peak wavelength selected from a range of 200 nm to 230 nm or from a range of about 200 nm to about 230 nm.

This is efficiently achieved in particular by emitting far-UVC light comprising or having a wavelength (or peak wavelength) of selected from about 200 nanometres to about 230 nanometres or more particularly selected from about selected from about 210 nanometres to about 225 nanometres, e.g. such as 210/about 210 nanometres, 222/about 220 nanometres, or 224/about 224 nanometres.

Far-UVC light, and in particular far-UVC light with these/such wavelengths has high absorbance in proteins.

$CO_2$ exhaled by humans, body odour, as well as body heat are all key attractants for mosquitos to locate the host. These molecules trigger host seeking and are detected by cellular transmembrane receptor proteins placed in the sensing organs of mosquitos. The sensing receptor proteins are directly exposed to surroundings to improve detection. As mentioned, far-UCV light, and in particular far-UVC light comprising or having a (peak) wavelength as mentioned above and herein, are distinguishable from wavelength above 230 nm due to their relatively high absorbance in protein. Hence, the receptor proteins used by the mosquitos for sensing of $CO_2$, body odor, and heat highly are susceptible to the far-UVC light. The far-UVC light emitted thus interacts with cellular receptors of the mosquitos thereby preventing detection of $CO_2$, body odour, and heat. This inhibits host-seeking behaviour through decreased ability to locate the host. Hence, the far-UVC light is efficient in repelling pests, such as mosquitos.

As pests like mosquitos and other insects have exoskeletons which is dense in proteins, they are especially susceptible to detrimental exposure of far-UCV light, and in particular to exposure by far-UVC light comprising or having a (peak) wavelength as mentioned above and herein. As insect wings also contain protein, winged insects are additionally susceptible to the detrimental exposure.

In addition to be effective against pests in general and mosquitos in particular, the device(s) and method(s) as disclosed herein is also effective against arachnids and other small or smaller insects, in particular winged insects, including flies, spiders, and their respective eggs and larva, etc.

In some embodiments, the UV light emitting element is configured to emit far-UVC light comprising or having a wavelength or peak wavelength of 230 nanometres or about 230 nanometres or less, i.e. light with a wavelength shorter than 230/about 230 nanometres, comprising or having a wavelength or peak wavelength selected from about 200 nanometres to about 230 nanometres, or comprising or having a wavelength or peak wavelength selected from 210/about 210 nanometres to 225/about 225 nanometres.

The UV light-emitting element may e.g. be a KrCl excimer lamp or lighting device configured to emit far-UVC light comprising or having a wavelength or a peak wavelength of 222 nanometres or about 222 nanometres. Alternatively, the UV light-emitting element may e.g. be a HeAg laser or lighting device configured to emit far-UVC light comprising or having a wavelength or a peak wavelength of 224 nanometres or about 224 nanometres. As another alternative, the UV light-emitting element may e.g. be an AlN (aluminum nitride) FED (field emission device) configured to emit far-UVC light comprising or having a wavelength or a peak wavelength of 210 nanometres or about 210 nanometres. As another alternative, the UV light-emitting element may be an iodine FED configured to emit far-UVC light comprising or having wavelength or a peak wavelength of 206 nanometres or about 206 nanometres.

In some embodiments, the UV light emitting element is configured to emit far-UVC light comprising or having a peak wavelength of 222 nanometres or about 222 nanometres.

In some embodiments, the pest repelling, killing and/or damaging UV light emitting device further comprises one or more user interface elements and wherein the control element is configured to output the control signal in response to one or more signals provided by or obtained from the one or more user interface elements.

In some embodiments, the UV light emitting element is or comprises at least one far-UVC LED, at least one far-UVC field emission device, and/or at least one far-UVC laser.

In some embodiments, the UV light emitting element is a far-UVC excimer lamp. The far-UVC excimer lamp may e.g. be a KrCl excimer lamp e.g. or preferably configured to emit light comprising or having a peak wavelength of 222 nanometres or about 222 nanometres.

In some embodiments, the pest repelling, killing and/or damaging UV light emitting device or the UV light emitting element comprises an optical band-pass filter configured to filter the far-UVC light, where the band-pass filter passes wavelengths between 200 nanometres or about 200 nanometres to 230 nanometres or about 230 nanometres, a sub-interval selected from an interval between about 200 nanometres to about 230 nanometres, or an interval comprising a wavelength of 222 (or 210 or 224) nanometres or about 222 (or about 210 or about 224) nanometres.

In some embodiments, the UV light emitting element is configured to emit coherent light obtained by sum-frequency generation.

In some embodiments, the UV light emitting element is or comprises a light source device, the light source device comprising at least one pump laser/pump source configured to emit light at a first predetermined wavelength, and an electromagnetic radiation frequency, or equivalent wavelength, converter, wherein a guiding module of the electromagnetic radiation frequency, or equivalent wavelength, converter is configured to receive and guide at least a part of the emitted light from the at least one pump laser light source, and an output light signal has a second predetermined wavelength different from the first predetermined wavelength.

In some embodiments, the electromagnetic radiation frequency, or equivalent wavelength, converter comprises a nonlinear optical component or part comprising or consisting of a predetermined nonlinear optical material, and the guiding module, the guiding module having a predetermined geometry defining or controlling an effective refractive index of the guiding module, and configured to receive and guide pump light resulting in a guided pump beam, and wherein the nonlinear optical component or part is
bonded with or joined to the guiding module, where the
bonding is configured to allow at least a part of the
guided pump beam to overlap and/or evanescently
couple into the nonlinear optical material, and
configured to nonlinearly convert the guided pump beam
in the nonlinear optical material to an un-guided signal
mode radiated as an output light signal at a different
frequency or an equivalent wavelength.

In some embodiments, the electromagnetic radiation frequency, or equivalent wavelength, converter comprises an optic coupler configured to receive light and provide it to the guiding module.

In some embodiments, the guiding module comprises at least one waveguide core and the nonlinear component or part is bonded with or joined to the at least one waveguide core of the guiding module.

In some embodiments, the guiding module comprises
a substrate material, being different from the predetermined nonlinear optical material, wherein the at least one waveguide core is arranged or deposited on a first side of the substrate material, or
a substrate material, being different from the predetermined nonlinear optical material, and cladding (e.g. one or more bottom claddings, e.g. in the form of one or more cladding layers) arranged or deposited on a first side of the substrate material and wherein the at least one waveguide core is arranged or deposited on a first side of the cladding.

In some embodiments, the nonlinear optical component or part and/or the guiding module comprises embedded electrodes and is configured to respectively change the effective refractive index of the nonlinear optical component or part and/or the guiding module in response to a respective change in applied electric field to the embedded electrodes.

In some embodiments, the converter comprises one or more planar optical structures configured to re-route and/or modulate light received or to be received by the guiding module thereby controlling the output light signal.

In some embodiments, the predetermined nonlinear optical material is one selected from the group consisting of:
barium borate (BBO),
cesium lithium borate (CLBO),
lithium borate (LBO),
potassium dideuterium phosphate (KDP),
potassium dideuterium phosphate (DKDP),
ammonium dihydrogen phosphate (ADP),
yttrium calcium oxoborate (YCOB), and
potassium fluoroboratoberyllate (KBBF).

In some embodiments, the guiding module is a guiding photonic integrated circuit.

In some embodiments, the at least one pump laser light source is configured to emit visible blue light and the output light signal is or comprises far-UVC light.

In some embodiments, the pest repelling, killing, and/or damaging UV light emitting device or the UV light-emitting element is configured to emit visible light in addition to far-UVC light. The visible light (emitted in addition to the far-UVC light) may e.g. be blue, red, or any other suitable visible light, or combinations thereof.

In some embodiments, the pest repelling, killing, and/or damaging UV light emitting device is comprised by or combined with
a patio heater or other outdoor heating unit,
an outdoor regular lighting unit, or
an indoor regular lighting unit.

Typically (and at least in some embodiments), the pest repelling, killing, and/or damaging UV light emitting device comprises a power supply, such as including solar panels, or similar configured to provide electrical power any elements or parts of the pest repelling, killing, and/or damaging UV light emitting device that requires it, e.g. to the control element and/or UV light emitting element.

According to a second aspect, one or more of the above objects is/are achieved, at least to an extent, by a pest repelling, killing, and/or damaging UV light irradiation method comprising irradiating one or more pests (e.g. mosquitos or other pests as described herein) with far-UVC light emitted by a pest repelling, killing, and/or damaging UV light emitting device according to the first aspect.

According to a third aspect, one or more of the above objects is/are achieved, at least to an extent, by use of a pest repelling, killing, and/or damaging UV light emitting device according to the first aspect to kill or damage one or more pests (e.g. mosquitos or other pests as described herein) by subjecting the one or more pests, e.g. or in particular mosquitos, to emitted far-UVC light, emitted by the pest repelling, killing, and/or damaging UV light emitting device according to the first aspect.

Further details and embodiments are disclosed in the following.

DEFINITIONS

All headings and sub-headings are used herein for convenience only and should not be constructed as limiting the invention in any way.

The use of any and all examples, or exemplary language provided herein, is intended merely to better illuminate the present invention and does not pose a limitation on the scope of the invention unless otherwise claimed. No language in the specification should be construed as indicating any non-claimed element as essential to the practice of the invention.

This invention includes all modifications and equivalents of the subject matter recited in the claims appended hereto as permitted by applicable law.

When or if relative expressions such as "upper" and "lower", "right" and "left", "horizontal" and "vertical", "clockwise" and "counter clockwise", "front" and "rear", or similar are used in the following terms, these typically refer to an actual situation of use. The shown figures are schematic representations for which reason the configuration of the different structures as well as their relative dimensions are intended to serve illustrative purposes only.

DETAILED DESCRIPTION

Various aspects and embodiments of a pest repelling, killing, and/or damaging UV light emitting device and a pest repelling, killing, and/or damaging UV light irradiation method as disclosed herein will now be described with reference to the figures.

The shown figures are schematic representations for which reason the configuration of the different structures as well as their relative dimensions are intended to serve illustrative purposes only.

Some of the different components are only disclosed in relation to a single embodiment of the invention, but are meant to be included in the other embodiments without further explanation.

Figures 1, 2:
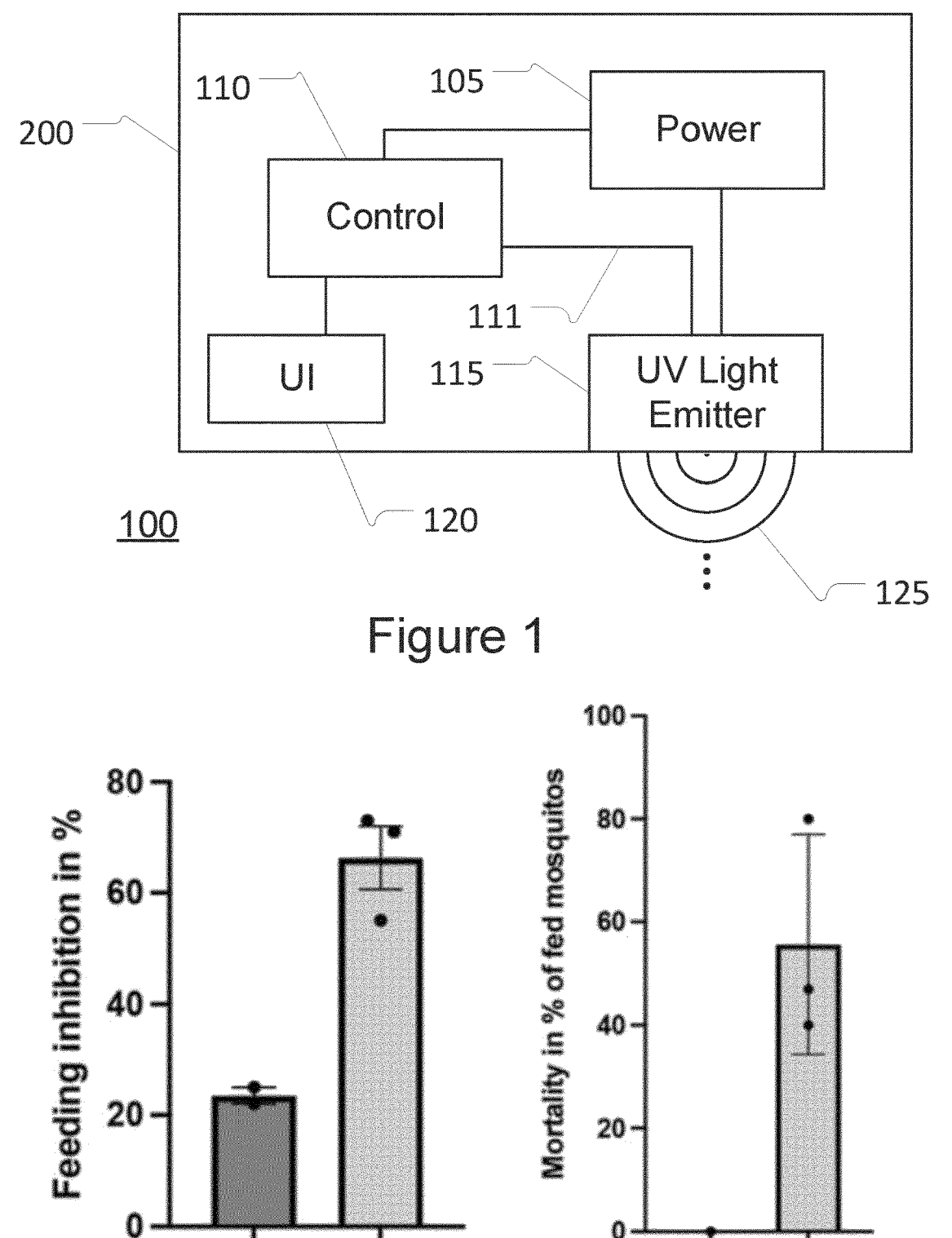
FIG. 1 schematically illustrates a pest repelling, killing, and/or damaging UV light-emitting device according to one aspect.
FIG. 2 schematically illustrates data of a test carried out using a pest repelling, killing, and/or damaging UV light emitting device or method as disclosed herein.

FIG. 1 schematically illustrates a pest repelling, killing, and/or damaging UV light emitting device according to one aspect.

Illustrated is one embodiment of a pest repelling, killing, and/or damaging UV light emitting device 100 as disclosed herein. The device 100 comprises a housing 200 comprising a suitable power source 105 (e.g. one or more rechargeable and/or replaceable batteries and/or solar panels), a control element 110 configured to output a control signal 111, one or more user interface elements 120, and a UV light emitting element 115.

The UV light emitting element 115 is configured to emit far-UVC light 125 in response to the control signal 111, and in at least some embodiments, the control element 110 is configured to output the control signal 111 in response to one or more signals 121 provided by or obtained from the one or more user interface elements 120. The one or more user interface elements 120 may e.g. be a simple on/off switch or similar providing a simple on/off signal to the control element 110, which in turn may provide an on/off control signal 111 to the UV light emitting element 115.

As disclosed herein, far-UVC light 125 will efficiently repel, kill, and/or damage one or more pests like insects, arachnids, or other pests (and in particular mosquitos) irradiated by the emitted far-UVC light 125.

In some embodiments, the UV light emitting element 115 is configured to emit far-UVC light 125 comprising or having a peak wavelength selected from about 200 nm to about 230 nm. In some additional embodiments, the emitted far-UVC light 125 comprises or has a wavelength or peak wavelength of 230/about 230 nanometres or less. In some further embodiments, the emitted far-UVC light 125 comprises or has a wavelength or peak wavelength selected from 210/about 210 nanometres to 225/about 225 nanometres. In some further embodiments, the emitted far-UVC light 125 comprises or has a peak wavelength of 222 nanometres or about 222 nanometres.

In some embodiments, the UV light emitting element 115 is or comprises at least one far-UVC LED (light emitting diode) 115, at least one far-UVC field emission device (FED) 115, and/or at least one far-UVC laser 115. In some embodiments, the UV light emitting element is configured to emit coherent light obtained by sum-frequency generation.

In some embodiments, the UV light emitting element 115 is a far-UVC excimer lamp 115.

Alternatively, the UV light emitting element 115 is or comprises another type of far UVC light emitting element.

In some further embodiments, the pest repelling, killing and/or damaging UV light emitting device 100 or the UV light emitting element 115 comprises an optical band-pass filter configured to filter the far-UVC light 125, where the band-pass filter is configured to transmit wavelengths between 200 nm to 230 nm or between about 200 nm to about 230 nm. Alternatively, the band-pass filter is configured to transmit wavelengths of a sub-interval selected from the interval between about 200 nm to about 230 nm. As yet another alternative, the band-pass filter is configured to transmit a wavelength of an interval within a predetermined range of a wavelength of 222/about 222 nm or of a different suitable wavelength (e.g. 210/about 210, 224/about 224, etc.).

The band-pass filter may be 'post' emission or 'pre' emission of the far-UVC light 125, i.e. the band-pass filter may be built-in or included with the UV light emitting element 115 (i.e. 'pre') whereby the UV light emitting element 115 will emit far-UVC light 125 after application of the band-pass filter or the band-pass filter may be located in the device 100 in the propagation path of far-UVC light 125 emitted by the UV light emitting element 115 (i.e. 'post') prior to or when exiting the device 100.

In some embodiments, the UV light emitting element 115 is or comprises a light source device as illustrated and explained in connection with FIG. 9 (see e.g. 18 in FIG. 9). The illustrated light source (and corresponding ones) is (are) relatively cheap to manufacture and particularly suited for mass production. In such embodiments, the light source device comprises at least one pump laser/pump source (see e.g. 13 in FIG. 9) configured to emit light at a first predetermined wavelength and an electromagnetic radiation frequency, or equivalent wavelength, converter (see e.g. 17 in FIGS. 4 and 9), where a guiding module (see e.g. 2, 3, 4, 5 in FIGS. 3, 4, 5, 6, 7, and 8) of the electromagnetic radiation frequency, or equivalent wavelength, converter (herein equally referred to simply as frequency converter) is configured to receive and guide at least a part of the emitted light from the at least one pump laser light source and where an output light signal (see e.g. 12 in FIGS. 6 and 7) has a second predetermined wavelength different from the first predetermined wavelength.

In some further embodiments, the frequency converter comprises a nonlinear optical component or part (see e.g. 1 in FIGS. 3, 4, 5, 6, 7, and 8) comprising or consisting of a predetermined nonlinear optical material, and the guiding module (mentioned above), the guiding module having a predetermined geometry defining or controlling an effective refractive index of the guiding module, and configured to receive and guide pump light (see e.g. 11 in FIG. 6) resulting in a guided pump beam (see e.g. 11 in FIG. 6), wherein the nonlinear optical component or part is bonded with or joined to the guiding module, where the bonding is configured to allow at least a part of the guided pump beam to overlap and/or evanescently couple into the nonlinear optical material, and configured to nonlinearly convert the guided pump beam in the nonlinear optical material to an un-guided signal mode radiated as an output light signal (12) at a different frequency or an equivalent wavelength.

In some further embodiments, the frequency converter comprises an optic coupler (see e.g. 6 in FIG. 7) configured to receive light and provide it to the guiding module.

Additional embodiments of the light source device (as illustrated and explained in connection with FIG. 9) and the frequency converter are disclosed elsewhere herein.

In some embodiments, the power supply 105 is configured to provide electrical power to any other element requiring electrical power, such as the control element 110 and the UV light emitting element 115 and e.g. the one or more user interface elements 120 (or one or some thereof).

In some further embodiments, the pest repelling, killing, and/or damaging UV light emitting device 100 as described above and/or herein is comprised by or combined with a patio heater or other outdoor heating unit, an outdoor regular, i.e. non-UV, lighting unit, an indoor regular, i.e. non-UV, lighting unit, a speaker unit, a wireless network device, and/or any combinations thereof.

In some embodiments, the pest repelling, killing, and/or damaging UV light emitting device or the UV light-emitting element is configured to emit visible light in addition to far-UVC light. The visible light (emitted in addition to the far-UVC light) may e.g. be blue, red, or any other suitable visible light.

An aspect relates to a use of a pest repelling, killing, and/or damaging UV light emitting device 100 as described above and/or herein.

A further aspect relates to a pest repelling, killing, and/or damaging UV light irradiation method, the method comprising irradiating one or more pests (e.g. mosquitos) with far-UVC light 125 emitted by a pest repelling, killing, and/or damaging UV light emitting device 100 as described above and/or herein.

FIG. 2 schematically illustrates data of a test carried out using a pest repelling, killing, and/or damaging UV light emitting device or method as disclosed herein.

A series of tests have been carried out using various embodiments of a pest repelling, killing, and/or damaging UV light emitting device and method as disclosed herein. FIG. 2 shows graphs of data for one such test carried out with a pest repelling, killing, and/or damaging UV light emitting device comprising an UV light emitting element being a far-UVC excimer lamp configured to emit far-UVC light having a peak wavelength of 222 or about 222 nanometres.

The illustrated data (FIG. 2) is for a test carried out by placing an immobilised guinea pig at one end in a three meter long finely netted cage (so no mosquito sized insects can enter or leave) with and without the presence of an UV light emitting device as disclosed herein. Fifty unfed 5-day-old pests in the form of mosquitos of the genus *Anopheles* were then released into the netted cage at the end opposite to the guinea pig. The UV light emitting device was located at the end of the tunnel together with the guinea pig. After three hours, the mosquitos were counted and assessed for feeding success and survival. This was done for the situation with no UV light and repeated for the situation with UV light and relevant data relating to feeding success and survival were obtained and recorded.

As readily can been seen from the data of graph 301 (comparing the feeding inhibition % for no UV light and UV light, respectively), a strong inhibition of feeding was observed in the case with UV light strongly supporting a repellent effect of the UV light emitting device. Likewise, it can readily be seen from the data of graph 302 (comparing the mortality in % of fed mosquitos for no UV light and UV light, respectively), a significantly higher mortality rate was observed for mosquitos that did feed during the test for the case with UV light. In the situation with no UV light, no dead mosquitos were detected while a mean of 55% mortality rate of fed mosquitos were determined with UV light.

The illustrated feeding inhibition in % is the number (in %) of non-feeding mosquitos in relation to the total number of mosquitos.

The illustrated mortality in % of fed mosquitos is the number (in %) of dead mosquitos compared to the number of mosquitos determined to have been feeding during the test. Mosquitos having fed would necessarily have been feeding on the guinea pig (in the absence of other mammals to feed on) bringing the feeding mosquitos within the vicinity and thereby under the effect of the UV light emitting device.

Accordingly, it can be seen that the presence of the UV light emitting device has a significant repelling effect as well as a pest or mosquito killing effect.

Figure 10:
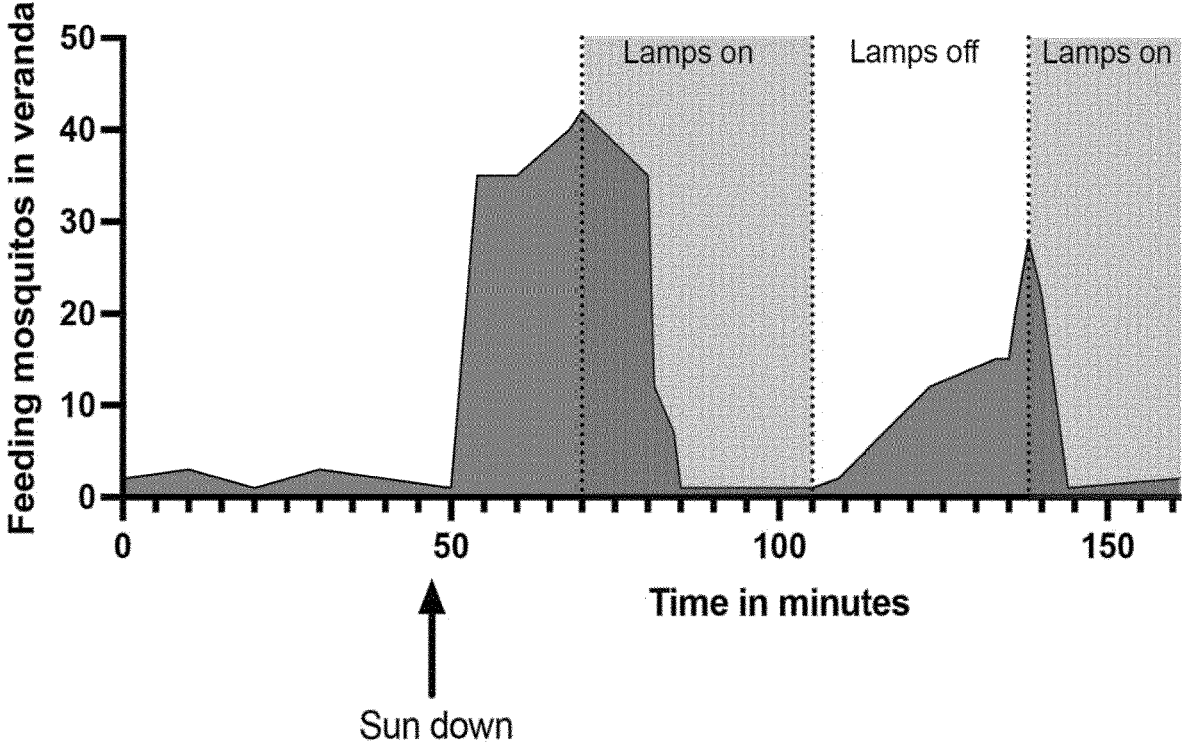
FIG. 10 schematically illustrates data of a second test carried out using a pest repelling, killing, and/or damaging UV light emitting device or method as disclosed herein.

FIG. 10 further schematically illustrates data of a further test carried out using a pest repelling, killing, and/or damaging UV light emitting device or method as disclosed herein, comprising an UV light emitting element being a far-UVC excimer lamp configured to emit far-UVC light having a peak wavelength of 222 or about 222 nanometres.

The illustrated data (FIG. 10) is for a test conducted in Cyprus in a rural area with extraordinary high presence of mosquitos. The purpose of this test was to demonstrate the prevention of mosquito biting using the pest repelling, killing, and/or damaging UV light emitting device or method as disclosed herein in an outdoors hotel veranda. Types of wild mosquitos observed in this test were *Aedes caspius, Aedes detritus,* and *Culex pipiens*. The veranda is measured 5×4 meters with a 2.8 m ceiling. UV222 lamps were installed to cover the veranda as well as a perimeter surrounding the veranda. The presence of mosquitos attempting to feed of a human volunteer was estimated and recorded throughout the setup. Initially, lamps were OFF until mosquito activity was heavy with more than 30 mosquitos in the veranda attempting to bite. Lamps were then turned ON and OFF in intervals, as illustrated in FIG. 10.

The results show that mosquito activity and presence in the outdoor veranda increased from low numbers (1-2) before sun down to much higher numbers (30-40) shortly after sundown (FIG. 10). When lamps were turned ON, these numbers decreased to a level similar to what was observed before sundown in approximately 15 minutes. When lamps were turned OFF these numbers increased again, reaching 30, before lamps were turned ON again. With lamps turned on, once again, mosquito activity was again decreased to low levels.

This test demonstrates that the far-UV light emitting device of the present invention is effective in deterring/repelling mosquitos including the malaria-bearing *Anopheles gambiae* but also other types such as *Aedes* and *Culex* species.

These findings have important implications the UV light emitting device and method of the present invention as it provides a pesticide-free and eco-friendly means of preventing spread of malaria as well as of other vector born infections such as Zika, Yellow Fever, West Nile Fever, and Dengue. The lamps can be placed to secure human residence, hospitals and more to prevent exposure of humans to these disease-carrying mosquitos. Additionally, this approach has strong ecological advantages when compared to strategies where insecticides are used to kill of mosquitos.

Figure 3:
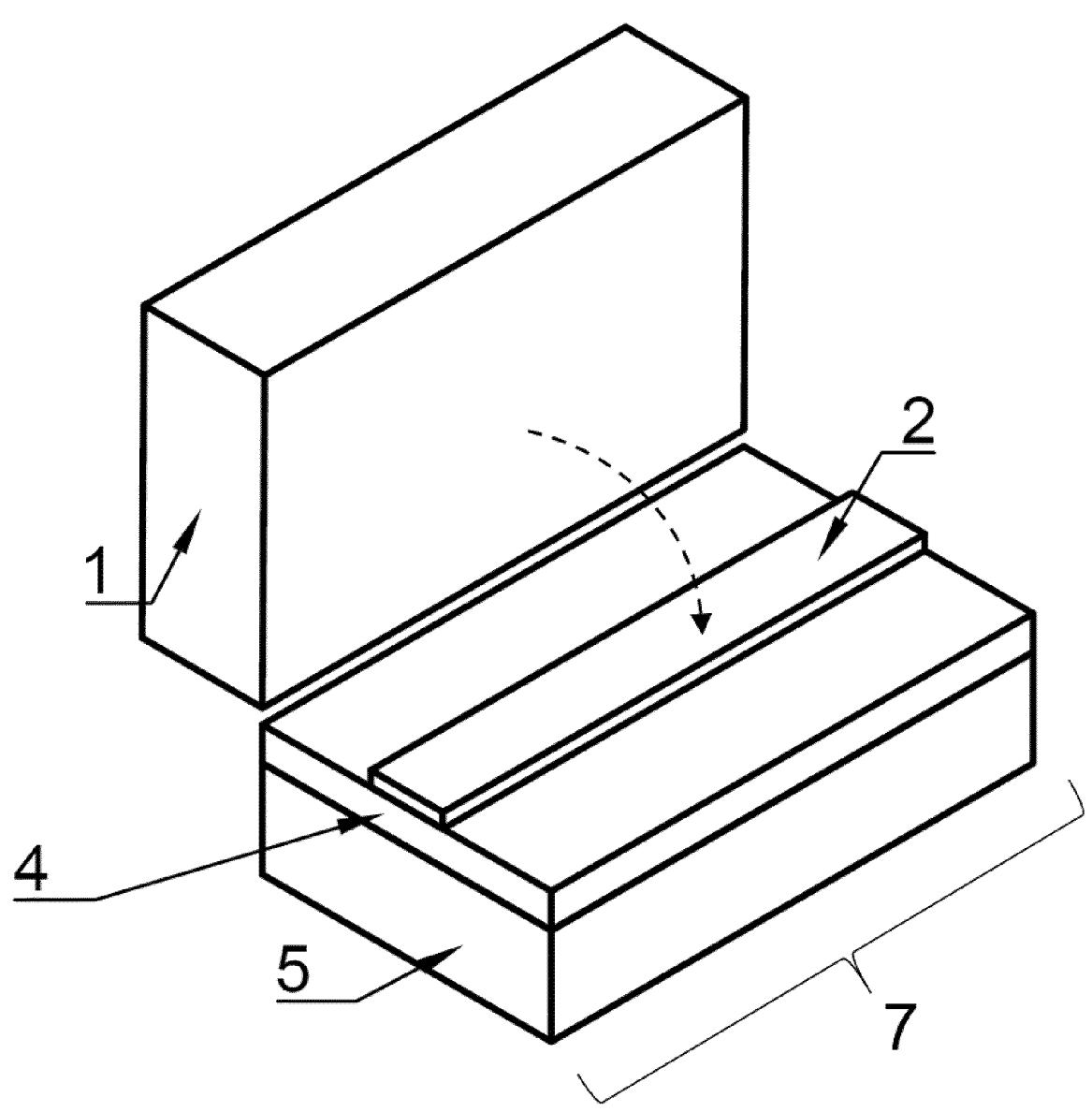
FIG. 3 schematically illustrates bonding of a nonlinear component to a guiding module photonic integrated circuit (PIC) comprising one or more waveguide cores on top of a substrate material as disclosed herein.

FIG. 3 schematically illustrates bonding (as indicated by the dashed arrow) of a nonlinear component (1) comprising nonlinear material to a guiding module PIC comprising one or more waveguide cores (2) on top of a substrate material (5) as disclosed herein. Once bonded (see e.g. FIG. 4), the nonlinear component (1) and the guiding module together forms an embodiment of a frequency converter (17) as disclosed herein. More particularly, the nonlinear component (1) is surface bonded with or jointed to one or more waveguide cores (2) of the guiding module. In some embodiments, the PIC has one or more bottom claddings (4) between the substrate (5) and the waveguide cores (2). The figure illustrates the bonding only for a very limited cutout of the overall part to maintain resolvability of individual components (see e.g. also FIG. 8), however an advantage of the surface bonding approach is that it is routinely done on a much larger scale. Further indicated is a length (7) of the waveguide(s).

Figure 4:
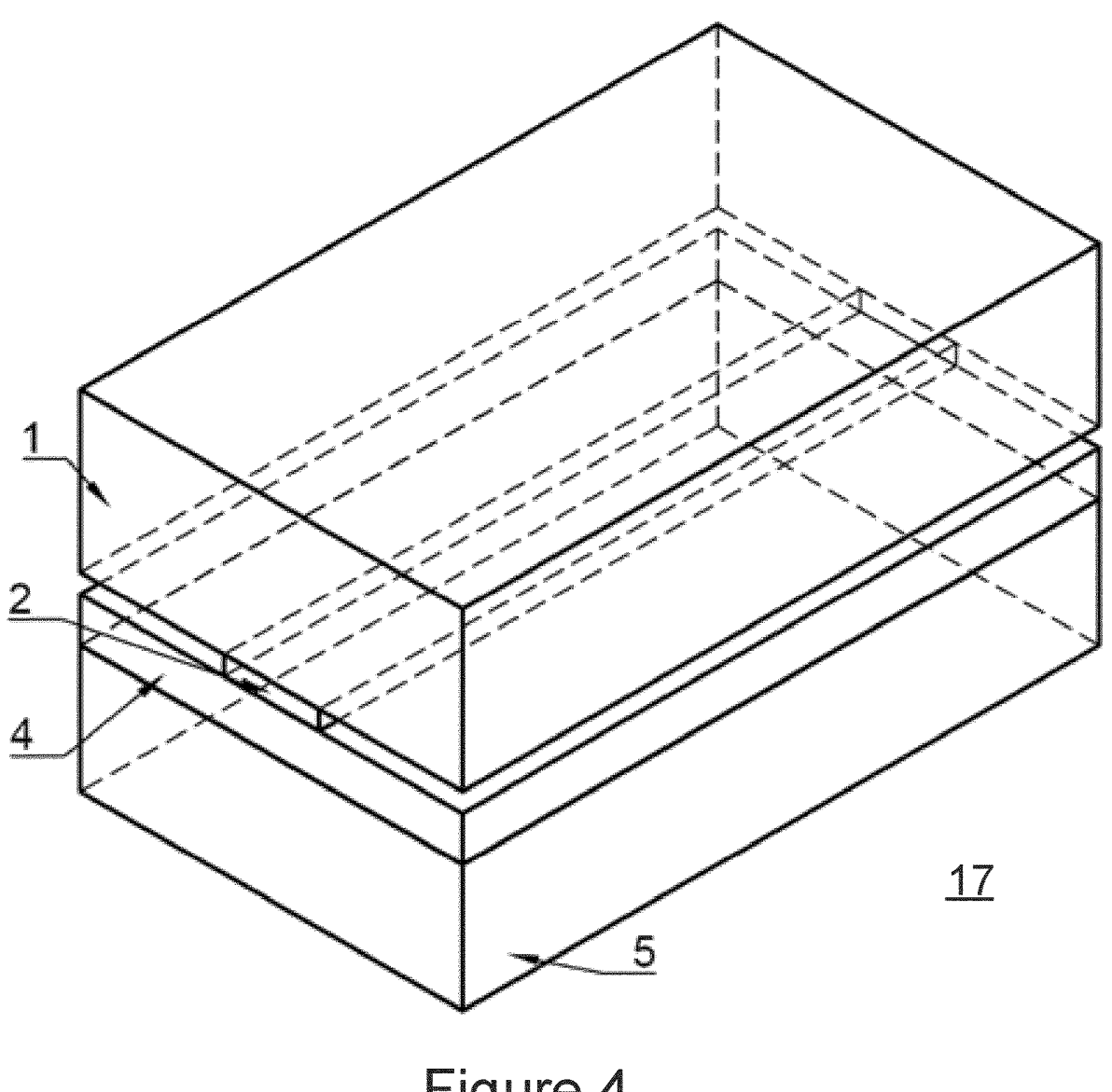
FIG. 4 schematically illustrates one embodiment of a frequency converter, as disclosed herein, after bonding.

FIG. 4 schematically illustrates one embodiment of a frequency converter (17), as disclosed herein, after bonding. The frequency converter (17) comprises a nonlinear component or part (1) of a nonlinear material, at least one optical waveguide core (2), a substrate (5), and in some further embodiments at least one bottom cladding (4) then supporting the waveguide core(s) (2). The bottom cladding (4) may e.g. be oxide cladding. The frequency converter (17) function as disclosed herein, and at least in some embodiments in accordance to Cherenkov-enabled nonlinear conversion.

Figure 5:
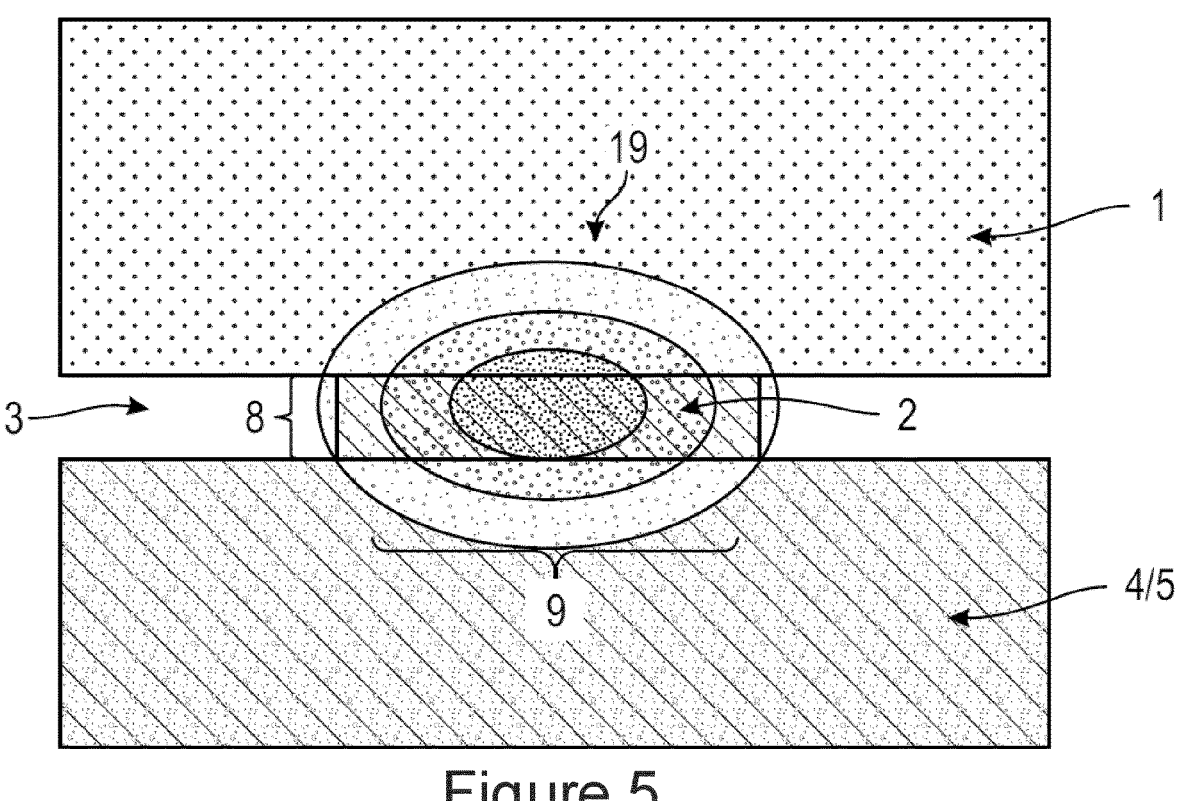
FIG. 5 schematically illustrate a cross-section of a frequency converter (e.g. of FIGS. 3 and 4) showing a cross-section of a waveguide sandwiched between a nonlinear component and a substrate (or the cladding for such embodiments) of the guiding module.

FIG. 5 schematically illustrates a cross-section of a frequency converter (e.g. of FIGS. 3 and 4) showing the cross-section of a waveguide core (2) sandwiched between the nonlinear component (1) and the substrate (5) (or the cladding (4) for such embodiments) of the guiding module. The cross-section is perpendicular to a length direction (see e.g. 7 in FIG. 3) of the waveguide core (2). An optical mode profile is shown as a shaded overlay (19) as an example. The illustrated schematic optical mode profile is for a light source being or comprising a pump laser emitting a pump beam (see e.g. 11 in FIG. 6). A thickness (8) of the waveguide core (2) is illustrated that also generally defines the spacing between the nonlinear component (1) and the substrate (5) (or the cladding (4)). To each other side of the waveguide core (2) there is a side cladding (to the opposite sides of the waveguide core (2) and between the nonlinear component (1) and the substrate (5)/cladding (4)) containing a surrounding cladding material (3), e.g. ambient air. Part of the optical intensity overlaps, i.e. evanescently couple, into the nonlinear material of the nonlinear component (1), allowing for frequency conversion through nonlinear interaction. The effective index and mode profile (19) of the pump beam depends on waveguide geometry (8 and 9). Note that both the nonlinear material and the substrate/cladding extends beyond the figure due to the minuscule waveguide dimensions.

Figure 6:
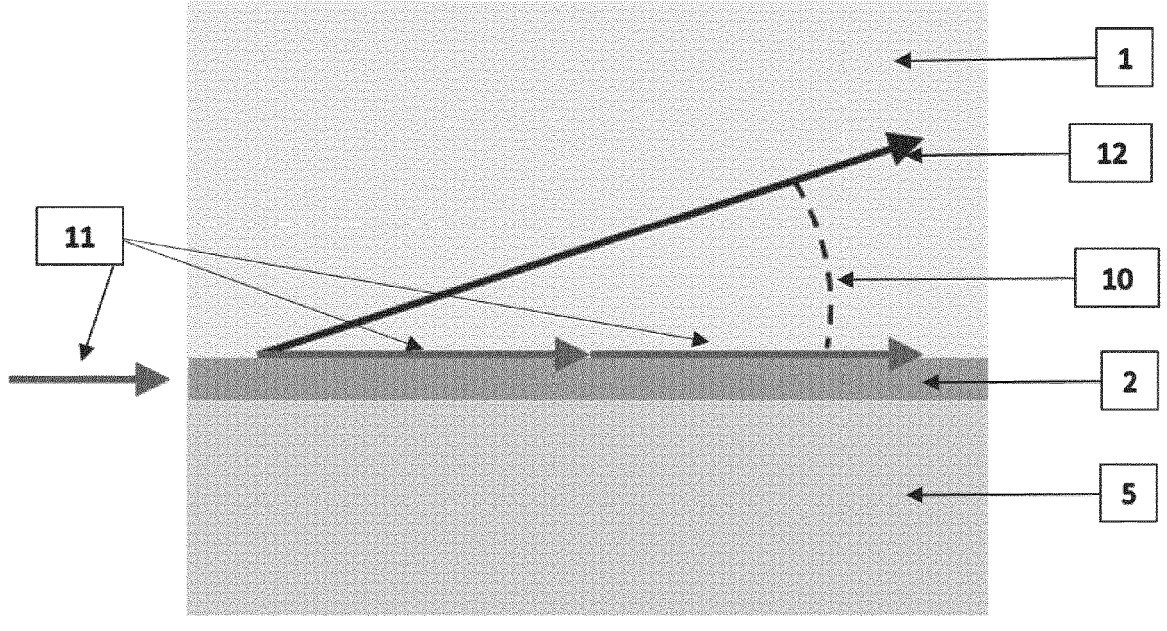
FIG. 6 schematically shows a sideview of the frequency converter exemplifying second harmonic generation (SHG) of a pump beam emitted by a pump laser light source.

FIG. 6 schematically shows a sideview of the frequency converter exemplifying second-harmonic generation (SHG) of a pump beam (11) emitted by a pump laser light source.

The pump beam (11) is mostly confined in the waveguide core (2). However, the overlap into the nonlinear material (1) ensures SHG of a signal beam (12) at the Cherenkov angle (10) ensuring phase matching. The requirements for phase matching in the SHG process is indicated graphically through the length and direction of the arrows denoting the pump (11) and signal (12) wavevectors. This figure shows only a part of the frequency converter along the length of the frequency converter, but SHG occurs continuously along the waveguide propagation axis.

Figure 7:
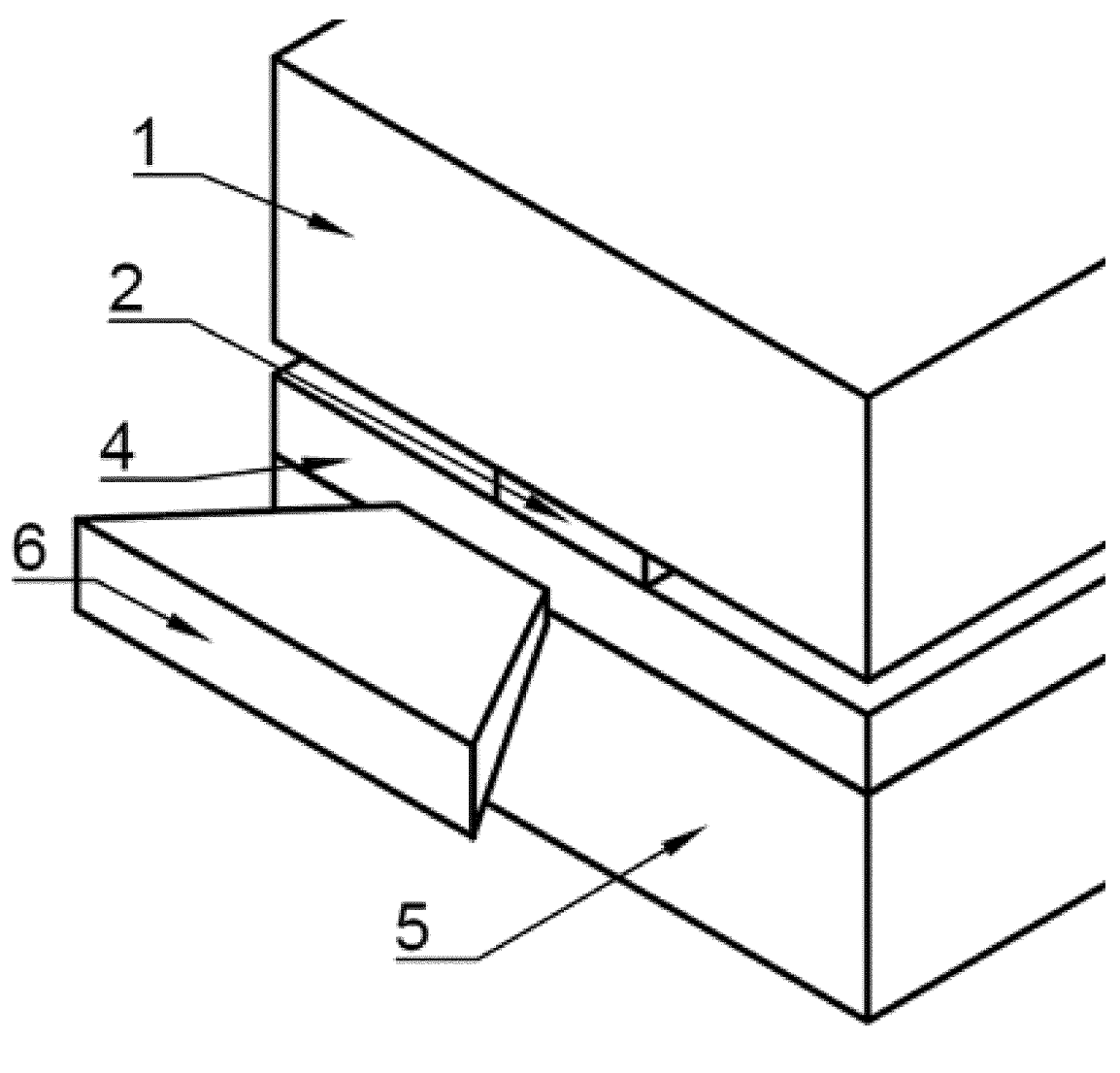
FIG. 7 schematically shows further embodiments, additionally comprising an optical input coupler.

FIG. 7 schematically shows further embodiments, additionally comprising an optical input coupler (6). A suitable photonic integrated circuit (PIC) is used to slim down the size of the optical mode through tapering of the waveguide dimension within the optical input coupler (6). The input coupler (6) could further enable combination of multiple pump beams though integrated optical elements such as multimode interference couplers, y-branches, etc.

Figure 8:
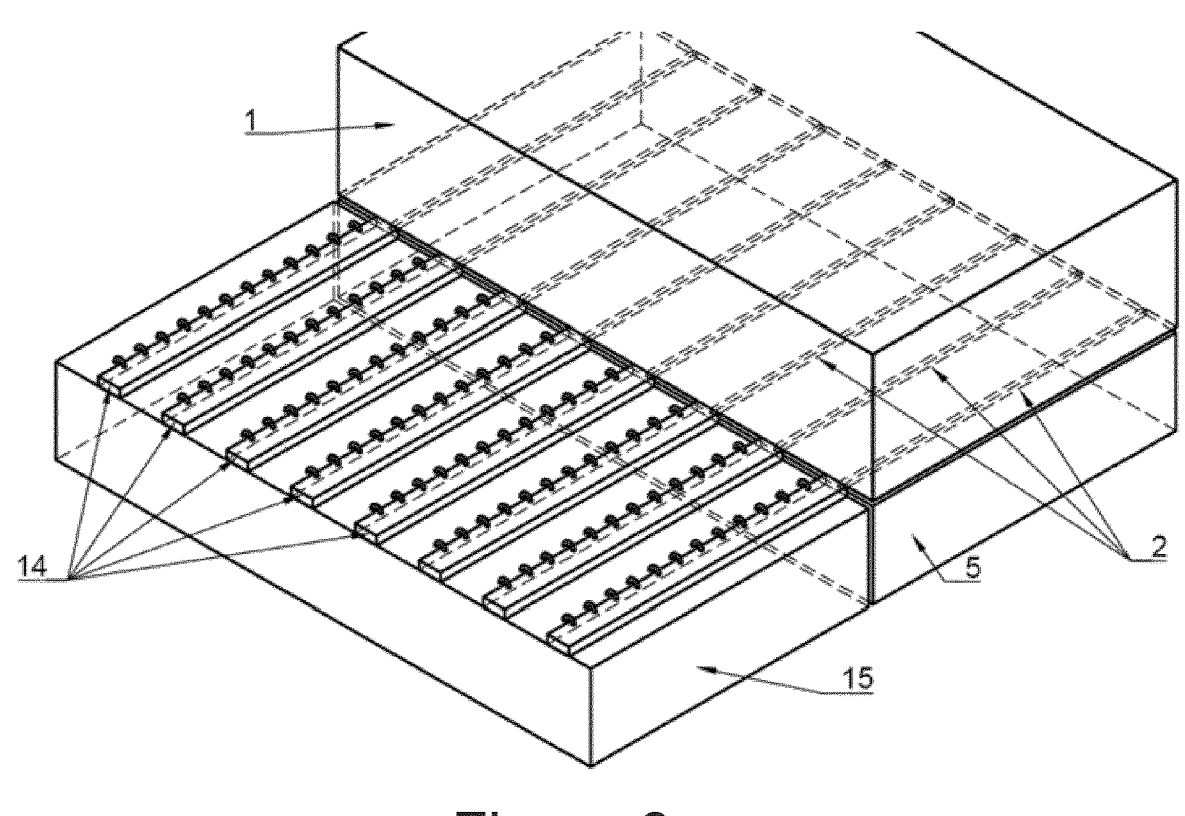
FIG. 8 schematically shows an embodiment of parallel fabrication and alignment of a plurality of complete light sources.

FIG. 8 schematically shows an embodiment of parallel fabrication and alignment of a plurality of complete light sources. Given that laser diodes typically are made as integrated devices in a process very similar to the fabrication process of the PIC in the frequency converter, the two components share similar feature size and overall build-structure, i.e. a functional layerstack (i.e. a laser diode active materials (14)) built upon a substrate material (i.e. a laser diode substrate material (15). This similarity is a significant enabler for a tight coupling between pump laser and frequency converter. Leveraging a unified pitch of the laser diode active materials (14) and of the respective waveguide cores (2) in the respective frequency converters, the optical alignment can be done for multiple devices/light sources simultaneously. Subsequent dicing between the waveguides readily facilitate large-scale manufacturing of multiple (hundreds or thousands) devices/light sources. In at least some embodiments, the laser output facets are butt-coupled directly to the waveguide facets on the frequency converters. The efficiency of the coupling can be optimized for instance by tapering the guiding module waveguide towards the facet to match the geometry of the laser emission region.

Figure 9:
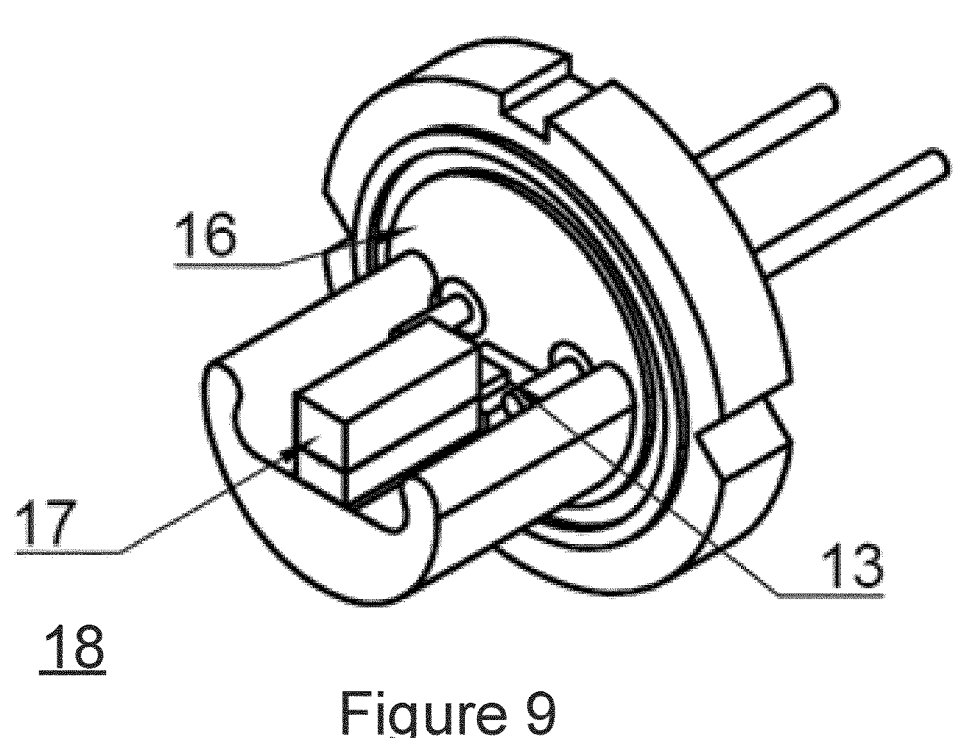
FIG. 9 schematically shows an example package of a compact light source/lighting device.

FIG. 9 schematically shows an example package of a compact light source/lighting device (18). In this example, a diode laser (13) and a frequency converter (17) (e.g. as shown in FIGS. 3-8) is placed in a TO-can (16). The TO-can (16) is a standardised packaging approach in the field of laser diodes and may be produced in high numbers at low prices. Complying to a standardised package enables compatibility with an entire range of current-supplies, fixtures, thermal management systems, etc.

Such a light source/lighting device 18 (and variants and embodiments thereof as disclosed herein) is particularly efficient as a UV light emitting element (see e.g. 115 in FIG. 1) as disclosed herein or a part thereof with respect to emitting far-UVC light (see e.g. 125 in FIG. 1), and in particular to emitting far-UVC comprising or having a peak wavelength of 222 nanometres or about 222 nanometres, in order to efficiently repel, kill, and/or damage one or more pests (and in particular mosquitos) irradiated by the emitted far-UVC light.

LIST OF REFERENCE NUMERALS

1. Nonlinear material e.g., BBO
2. Waveguide core e.g., SiN
3. Surrounding cladding material e.g., Air
4. Bottom cladding material e.g., SiO2
5. Substrate material of the guiding module e.g., Si 6. Spot size converter/combiner on a PIC
7. Length of the waveguide
8. Thickness of the waveguide core
9. Width of the waveguide core
10. Cherenkov angle
11. Pump beam
12. Signal beam
13. First diode laser pump/(first) laser light source
14. Laser diode active material
15. Laser diode substrate material
16. TO-can
17. Frequency converter
18. Light source/light source device
19. Optical mode profile
100. Pest repelling, killing, and/or damaging UV light emitting device
105. Power supply
110. Control element
111. Control signal
115. UV light emitting element
120. User interface (UI) element(s)
121. One or more UI element signals
125 Emitted UV light (far-UVC)
200. Housing Some preferred embodiments have been shown in the foregoing, but it should be stressed that the invention is not limited to these, but may be embodied in other ways within the subject matter defined in the following claims.

It should be emphasized that the term "comprises/comprising" when used in this specification is taken to specify the presence of stated features, elements, steps or components but does not preclude the presence or addition of one or more other features, elements, steps, components or groups thereof.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The mere fact that certain measures are recited in mutually different dependent claims does not indicate that a combination of these measures cannot be used to an advantage.

It will be apparent to a person skilled in the art that the various embodiments of the invention as disclosed and/or elements thereof can be combined without departing from the scope of the invention as defined in the claims.

The invention claimed is:
1. A pest repelling UV light-emitting device comprising
a housing,
a control element configured to output a control signal, and
a UV light-emitting element configured to emit, in response to the control signal, far-UVC light thereby repelling one or more pests, e.g. or in particular mosquitos, irradiated by the emitted far-UVC light, wherein the UV light emitting element is or comprises a light source device, the light source device comprising at least one pump laser/pump source configured to emit light at a first predetermined wavelength, and
an electromagnetic radiation frequency, or equivalent wavelength, converter,
wherein
a guiding module of the electromagnetic radiation frequency, or equivalent wavelength, converter is configured to receive and guide at least a part of the emitted light from the at least one pump laser light source, and
an output light signal has a second predetermined wavelength different from the first predetermined wavelength.

2. The pest repelling, UV light emitting device according to claim 1, wherein the UV light emitting element is configured to emit far-UVC light
comprising or having a wavelength or peak wavelength of 230 nanometres or about 230 nanometres or less,
comprising or having a wavelength or peak wavelength selected from about 200 nanometres to about 230 nanometres, or
comprising or having a wavelength or peak wavelength selected from 210/about 210 nanometres to 225/about 225 nanometres.

3. The pest repelling UV light emitting device according to claim 1, wherein the UV light emitting element is configured to emit far-UVC light comprising or having a peak wavelength of 222 nanometres or about 222 nanometres.

4. The pest repelling UV light emitting device according to claim 1, wherein the pest repelling UV light emitting device further comprises one or more user interface elements and wherein the control element is configured to output the control signal in response to one or more signals provided by or obtained from the one or more user interface elements.

5. The pest repelling UV light emitting device according to claim 1, wherein the UV light emitting element is or comprises at least one far-UVC LED, at least one far-UVC field emission device, and/or at least one far-UVC laser.

6. The pest repelling UV light emitting device according to claim 1, wherein the pest repelling UV light emitting device or the UV light emitting element comprises an optical band-pass filter configured to filter the far-UVC light, where the band-pass filter transmits wavelengths between 200 nanometres or about 200 nanometres to 230 nanometres or about 230 nanometres, a sub-interval selected from an interval between about 200 nanometres to about 230 nanometres, or an interval comprising a wavelength of 222 nanometres or about 222 nanometres.

7. The pest repelling UV light emitting device according to claim 1, wherein the electromagnetic radiation frequency, or equivalent wavelength, converter comprises
a nonlinear optical component or part comprising or consisting of a predetermined nonlinear optical material, and
the guiding module, the guiding module
having a predetermined geometry defining or controlling an effective refractive index of the guiding module, and
configured to receive and guide pump light resulting in a guided pump beam, and wherein the nonlinear optical component or part is
bonded with or joined to the guiding module, where the bonding is configured to allow at least a part of the guided pump beam to overlap and/or evanescently couple into the nonlinear optical material, and configured to nonlinearly convert the guided pump beam in the nonlinear optical material to an un-guided signal mode radiated as an output light signal at a different frequency or an equivalent wavelength.

8. The pest repelling UV light emitting device according to claim 1, wherein the electromagnetic radiation frequency, or equivalent wavelength, converter comprises an optic coupler configured to receive light and provide it to the guiding module.

9. The pest repelling UV light emitting device according to claim 1, wherein the guiding module comprises at least one waveguide core and the nonlinear component or part is bonded with or joined to the at least one waveguide core of the guiding module.

10. The pest repelling UV light emitting device according to claim 1, wherein the guiding module comprises a substrate material, being different from the predetermined non-linear optical material, wherein the at least one waveguide core is arranged or deposited on a first side of the substrate material, or a substrate material, being different from the predetermined non-linear optical material, and cladding arranged or deposited on a first side of the substrate material and wherein the at least one waveguide core is arranged or deposited on a first side of the cladding.

11. The pest repelling UV light emitting device according to claim 1, wherein the nonlinear optical component or part and/or the guiding module comprises embedded electrodes and is configured to respectively change the effective refractive index of the nonlinear optical component or part and/or the guiding module in response to a respective change in applied electric field to the embedded electrodes.

12. The pest repelling UV light emitting device according to claim 1, wherein the converter comprises one or more planar optical structures configured to re-route and/or modulate light received or to be received by the guiding module thereby controlling the output light signal.

13. The pest repelling UV light emitting device according to claim 1, wherein the predetermined nonlinear optical material is one selected from the group consisting of:

barium borate (BBO),
cesium lithium borate (CLBO),
lithium borate (LBO),
potassium dideuterium phosphate (KDP),
potassium dideuterium phosphate (DKDP),
ammonium dihydrogen phosphate (ADP), yttrium calcium oxoborate (YCOB), and
potassium fluoroboratoberyllate (KBBF).

14. The pest repelling UV light emitting device according to claim 1, wherein the guiding module is a guiding photonic integrated circuit.

15. The pest repelling UV light emitting device according to claim 1, wherein the at least one pump laser light source is configured to emit visible blue light and the output light signal is or comprises far-UVC light.

16. The pest repelling UV light emitting device according to claim 1, wherein the pest repelling UV light emitting device or the UV light-emitting element is configured to emit visible light in addition to far-UVC light.

17. The pest repelling UV light emitting device according to claim 1, wherein the pest repelling UV light emitting device is comprised by or combined with a patio heater or other outdoor heating unit,
an outdoor regular lighting unit, or
an indoor regular lighting unit.

18. A pest repelling UV light irradiation method comprising irradiating one or more pests with far-UVC light emitted by the pest repelling UV light emitting device according to claim 1, wherein the one or more pests include mosquitos.

19. Use of the pest repelling UV light emitting device according to claim 1 to repel one or more pests by subjecting the one or more pests to emitted far-UVC light, emitted by the pest repelling UV light emitting device, wherein the one or more pests include mosquitos.

20. A pest repelling UV light-emitting device comprising a housing,
a control element configured to output a control signal, and
a UV light-emitting element configured to emit, in response to the control signal, far-UVC light thereby repelling one or more pests, e.g. or in particular mosquitos, irradiated by the emitted far-UVC light,
wherein the UV light emitting element is configured to emit coherent light obtained by sum-frequency generation.

21. The pest repelling UV light-emitting device of claim 20, wherein the UV light emitting element is a far-UVC excimer lamp.

* * * * *